United States Patent
Chu et al.

(10) Patent No.: US 10,120,953 B2
(45) Date of Patent: Nov. 6, 2018

(54) SYSTEM DATA COMPRESSION SYSTEM AND METHOD THEREOF

(71) Applicant: Korea Electric Power Corporation, Seoul (KR)

(72) Inventors: Cheol-Min Chu, Daejeon (KR); Sang-Yun Yun, Daejeon (KR); Seong-Chul Kwon, Daejeon (KR); Il-Keun Song, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 286 days.

(21) Appl. No.: 14/426,138

(22) PCT Filed: Oct. 4, 2012

(86) PCT No.: PCT/KR2012/008014
§ 371 (c)(1),
(2) Date: Mar. 4, 2015

(87) PCT Pub. No.: WO2014/046328
PCT Pub. Date: Mar. 27, 2014

(65) Prior Publication Data
US 2015/0227639 A1    Aug. 13, 2015

(30) Foreign Application Priority Data

Sep. 20, 2012  (KR) ........................ 10-2012-0104712

(51) Int. Cl.
*G06F 17/30* (2006.01)
*G06Q 10/06* (2012.01)
*G06Q 50/06* (2012.01)

(52) U.S. Cl.
CPC .... *G06F 17/30917* (2013.01); *G06F 17/3089* (2013.01); *G06F 17/30598* (2013.01);
(Continued)

(58) Field of Classification Search
CPC ......... G06F 17/30598; G06F 17/30864; G06F 17/3089; G06F 17/30917; G06Q 50/06
See application file for complete search history.

(56) References Cited

U.S. PATENT DOCUMENTS 5,815,400 A *  9/1998  Hirai .................... G05B 19/401
                                                    700/173
6,199,059 B1 *  3/2001  Dahan ............... G06F 17/30392
(Continued)

FOREIGN PATENT DOCUMENTS

JP      10-56735 A      2/1998
JP    2004-242452 A     8/2004
(Continued)

OTHER PUBLICATIONS

International Search Report dated Apr. 1, 2013 issued in International Patent Application No. PCT/KR2012/008014 (English translation).

*Primary Examiner* — Daniel A Kuddus
(74) *Attorney, Agent, or Firm* — McDermott Will & Emery LLP

(57) ABSTRACT

The present invention relates to a system data abbreviation system and method. The system data abbreviation system includes a data mapping unit configured to classify system data, provided by an external database, into classes of a database of an internal application program and to then map the classified system data; a data search unit configured to search for data of the class to be abbreviated from the database of the application program; and a data abbreviation unit configured to group the found data of the class, to set link relations between data that belongs to the group, to set link relations between the group and the classes of the database of the application program, and to then abbreviate the data.

7 Claims, 12 Drawing Sheets

(52) U.S. Cl.
CPC ....... *G06F 17/30864* (2013.01); *G06Q 10/06* (2013.01); *G06Q 50/06* (2013.01)

(56) References Cited

U.S. PATENT DOCUMENTS

| | | | | |
|---|---|---|---|---|
| 7,743,078 | B2* | 6/2010 | Azvine | G06F 17/30292 706/12 |
| 8,423,245 | B2* | 4/2013 | Kimura | B62D 5/0472 701/1 |
| 8,694,504 | B2* | 4/2014 | Beretich, Jr. | G06F 17/30713 707/737 |
| 8,898,159 | B2* | 11/2014 | Brown | G06F 17/30654 707/730 |
| 9,208,179 | B1* | 12/2015 | Song | G06F 17/30067 |
| 9,483,551 | B2* | 11/2016 | Beretich, Jr. | G06F 17/30696 |
| 2003/0023440 | A1* | 1/2003 | Chu | G10L 15/19 704/249 |
| 2004/0177068 | A1* | 9/2004 | Beretich, Jr. | G06F 17/30713 |
| 2005/0192968 | A1* | 9/2005 | Beretich, Jr. | G06F 17/30637 |
| 2006/0026174 | A1* | 2/2006 | Lundberg | G06F 17/30684 |
| 2006/0161554 | A1* | 7/2006 | Lucovsky | G06F 21/335 |
| 2006/0224581 | A1* | 10/2006 | Sasai | G06F 17/30646 |
| 2009/0170984 | A1* | 7/2009 | Blum | C08K 5/0041 524/99 |
| 2009/0187548 | A1* | 7/2009 | Ji | G06F 17/30905 |
| 2009/0234869 | A1* | 9/2009 | Azvine | G06F 17/30292 |
| 2012/0078889 | A1* | 3/2012 | Chu-Carroll | G06F 17/30654 707/723 |
| 2013/0013615 | A1* | 1/2013 | Brown | A61B 5/00 707/741 |
| 2013/0018876 | A1* | 1/2013 | Chu-Carroll | G06F 17/30654 707/723 |

FOREIGN PATENT DOCUMENTS

| | | |
|---|---|---|
| JP | 2006-005992 A | 1/2006 |
| JP | 2006-318400 A | 11/2006 |
| JP | 2007-330010 A | 12/2007 |
| KR | 10-0299307 B1 | 6/2001 |
| KR | 10-0901319 B1 | 6/2009 |
| KR | 10-0964298 B1 | 6/2010 |

* cited by examiner

SYSTEM DATA COMPRESSION SYSTEM AND METHOD THEREOF

RELATED APPLICATIONS

This application is the U.S. National Phase under 35 U.S.C. § 371 of International Application No. PCT/KR2012/008014, filed on Oct. 4, 2012, which in turn claims the benefit of Korean Application No. 10-2012-0104712, filed on Sep. 20, 2012, the disclosures of which Applications are incorporated by reference herein.

TECHNICAL FIELD

The present invention relates to a system data abbreviation system and method, and provides a system data abbreviation system and method that abbreviate distribution system topology data in order to increase the management efficiency of a smart distribution management system.

BACKGROUND ART

The monitoring, control and management system of a typical electric power system is configured in accordance with its purposes in order to perform management for the efficient operation and control of a power plant for generating electricity, a transmission and distribution system for transmitting the generated electricity to consumers, and the load systems of the consumers.

A measurement system transmits measured information, such as current or voltage in the form of an analog, digital or pulse sensor signal in a power generation and system process, or a modem signal of a remote terminal unit (RTU) or the like in a power system, to a collection and control system at either a close location or a remote location.

The collection control system for collecting various types of spot-specific information functions to collect various types of signals transmitted from a spot, change the collected information into engineering information, and then convert the engineering information into actual values, or may function to calculate new spot transmission information by controlling the above information. All the information is transmitted to a DB management system over a network. The DB management system manages and operates various types of topology data information in accordance with purposes. In a conventional DB processing method, both the static and dynamic information of entry data within a table of a DB management system are used together and configured within a single table. This presents a problem with use by various application programs within a short period of time when the application programs of a power system search, read and record information required for power equipment (a transformer, a line, a generator, etc.).

Meanwhile, Korean Patent No. 10-0299307 discloses a method of constructing the characteristic matrix of system data via load flow calculation and fault-related calculation in order to analyze topology data information. That is, in order to conduct computation, a topology characteristic matrix for system analysis is constructed by converting an electrical node state into an analytic node state. If all electrical nodes are considered as being included in a computational range, the size of the matrix increases. Accordingly, a problem with efficiency is further compounded in the case of a large-scale distribution system.

DISCLOSURE

Technical Problem

Accordingly, the present invention has been made keeping in mind the above problems occurring in the prior art, and an object of the present invention is to provide a system data abbreviation system and method, which classify the distribution system topology data of a smart distribution management system into classes, group the data and thus abbreviate the data, thereby improving the management efficiency and practicability of an application program.

Another object of the present invention is to provide a system data abbreviation system and method, which classify distribution system topology data into classes, group the data and thus abbreviate the data, thereby providing accurate system state information to the administrator of a smart distribution management system.

Still another object of the present invention is to provide a system data abbreviation system and method, which classify distribution system topology data into classes, group the data and thus abbreviate the data, thereby eliminating electrical nodes unnecessary in terms of mathematical computation, and thus increasing the efficiency of mathematical computation attributable to analytic nodes.

Technical Solution

In order to accomplish the above-described objects, the present invention provides a system data abbreviation system, including a data mapping unit configured to classify system data, provided by an external database, into classes of a database of an internal application program and to then map the classified system data; a data search unit configured to search for data of the class to be abbreviated from the database of the application program; and a data abbreviation unit configured to group the searched data of the class, to set link relations between data that belongs to the group, to set link relations between the group and the classes of the database of the application program, and to then abbreviate the data.

The data mapping unit may include a data classification unit configured to classify the system data of the external database into the data classes of the application program database; a node generation unit configured to generate nodes based on the classes of the data; and a mapping unit configured to perform mapping that generates a link structure between the nodes and the data.

The data classes of the database of the application program are each classified as a branch or a switch.

The mapping unit, if the link structure between the nodes and the data has not been generated, may search for a class similar to the class that the data belongs, and then may perform the mapping.

The data search unit may include a branch search unit configured to check whether lines have been connected to the node of the data in order to determine whether the corresponding data is a simple branch; a switch search unit configured to check whether a switch provided at the node of the data is a manual switch or a user-designated switch; and an abbreviation class extraction unit configured to, if the connected lines of the node are three or more in number or the switch provided at the node of the data is not a manual switch or a user-designated switch the node, extract the data of the corresponding class as an abbreviation class.

The data abbreviation unit may include a grouping unit configured to group the class of the data to be abbreviated;

and a link relation setting unit configured to set link relations between the data that belongs to the group, and to set link relations between the group and the classes of the database of the application program.

The system data abbreviation system may further include a system abbreviation database configured to store the link relations set by the data abbreviation unit.

In order to accomplish the above-described objects, the present invention provides a system data abbreviation method, including classifying system data, provided by an external database, into classes of a database of an internal application program, and then mapping the classified system data; searching for data of the class to be abbreviated from the database of the application program; and grouping the searched data of the class, setting link relations between data that belongs to the group, setting link relations between the group and the classes of the database of the application program, and then abbreviating the data.

Classifying the system data into the classes of the database of the internal application program and then mapping the classified system data may include classifying the system data of the external database into the data classes of the application program database; generating nodes based on the classes of the data; and performing mapping that generates a link structure between the nodes and the data.

Performing the mapping, if the link structure between the nodes and the data has not been generated, may include searching for a class similar to the class that the data belongs, and then performing the mapping.

Searching for the data of the class to be abbreviated may include checking whether lines have been connected to the node of the data in order to determine whether the corresponding data is a simple branch; checking whether a switch provided at the node of the data is a manual switch or a user-designated switch; and, if the connected lines of the node are three or more in number or the switch provided at the node of the data is not a manual switch or a user-designated switch the node, extracting the data of the corresponding class as an abbreviation class.

Abbreviating the data may include grouping the data of the class to be abbreviated; and setting link relations between the data that belongs to the group, and also setting link relations between the group and the classes of the database of the application program.

Advantageous Effects

The system data abbreviation system and method having the above-described configuration according to the present has the advantage of classifying the distribution system topology data of a smart distribution management system into classes, grouping the data and thus abbreviating the data, thereby improving the management efficiency and practicability of an application program.

Furthermore, the present invention has the advantage of classifying distribution system topology data into classes, grouping the data and thus abbreviating the data, thereby providing accurate system state information to the administrator of a smart distribution management system.

Furthermore, the present invention has the advantage of classifying distribution system topology data into classes, grouping the data and thus abbreviating the data, thereby eliminating electrical nodes unnecessary in terms of mathematical computation, and thus increasing the efficiency of mathematical computation attributable to analytic nodes.

DESCRIPTION OF DRAWINGS

FIG. 15 is a diagram illustrating a method of converting data in the sequence of the system data abbreviation method according to the embodiment of the present invention.

MODE FOR INVENTION

Figure 1:
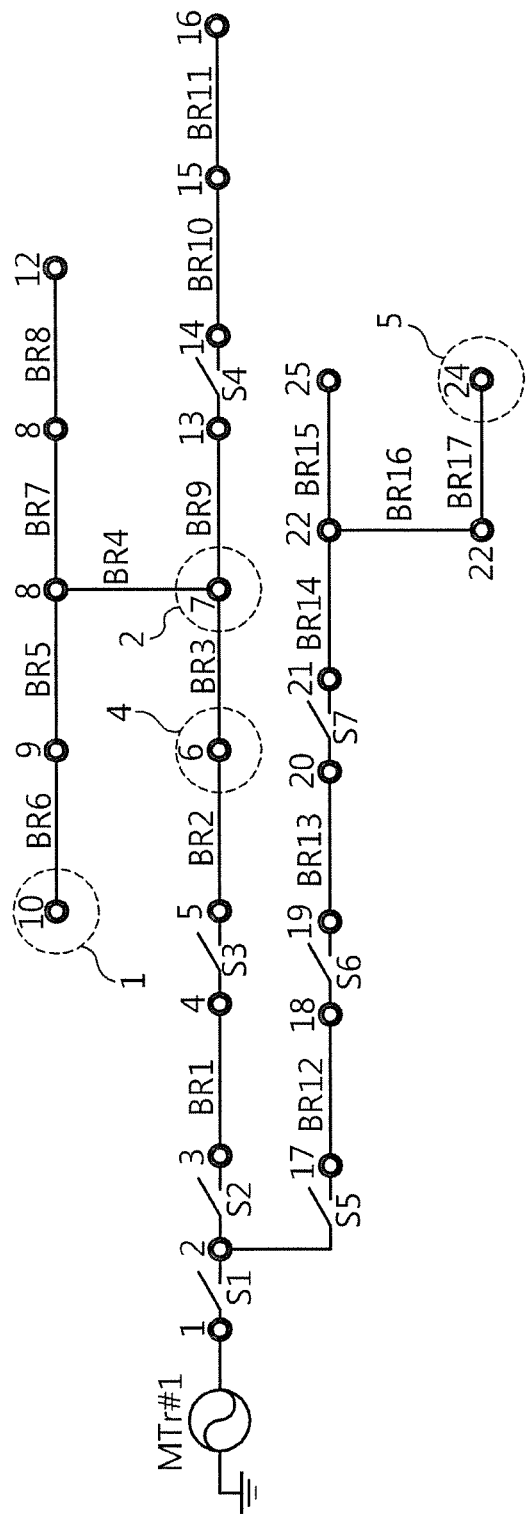
FIG. 1 is a diagram illustrating an electrical node state for the analysis of distribution system data.

Preferred embodiments of the present invention will be described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Figure 2:
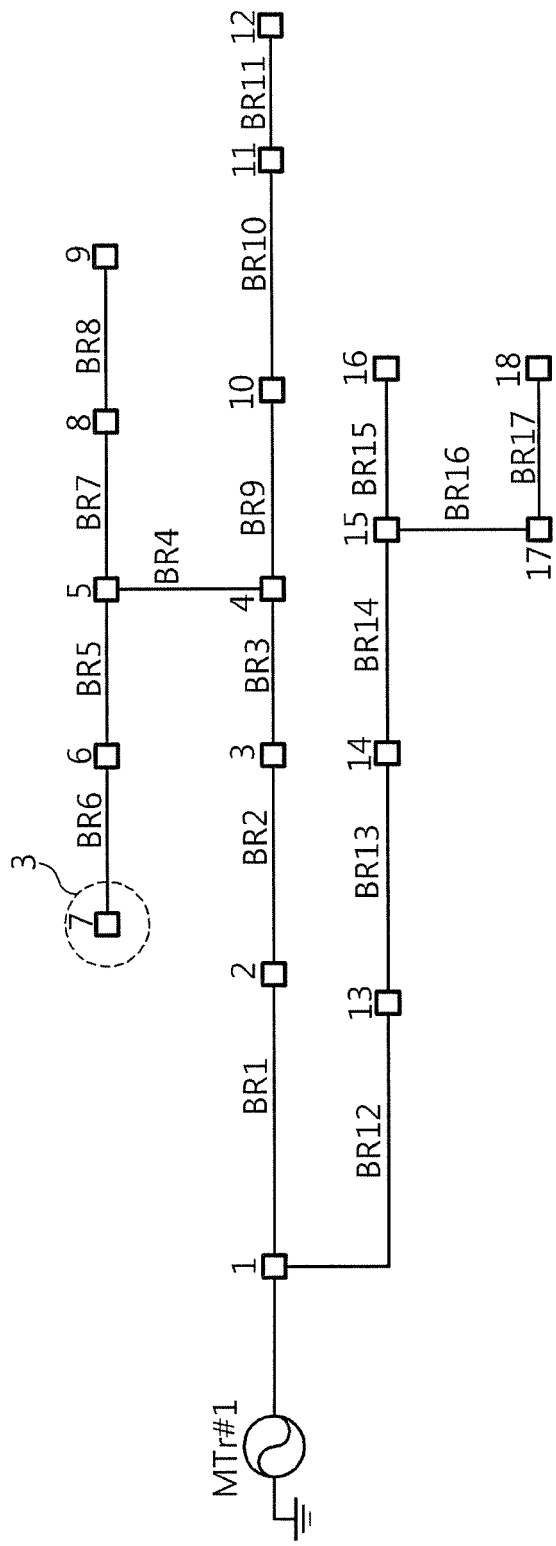
FIG. 2 is a diagram illustrating an analytic node state for the analysis of distribution system data.
Figure 3:
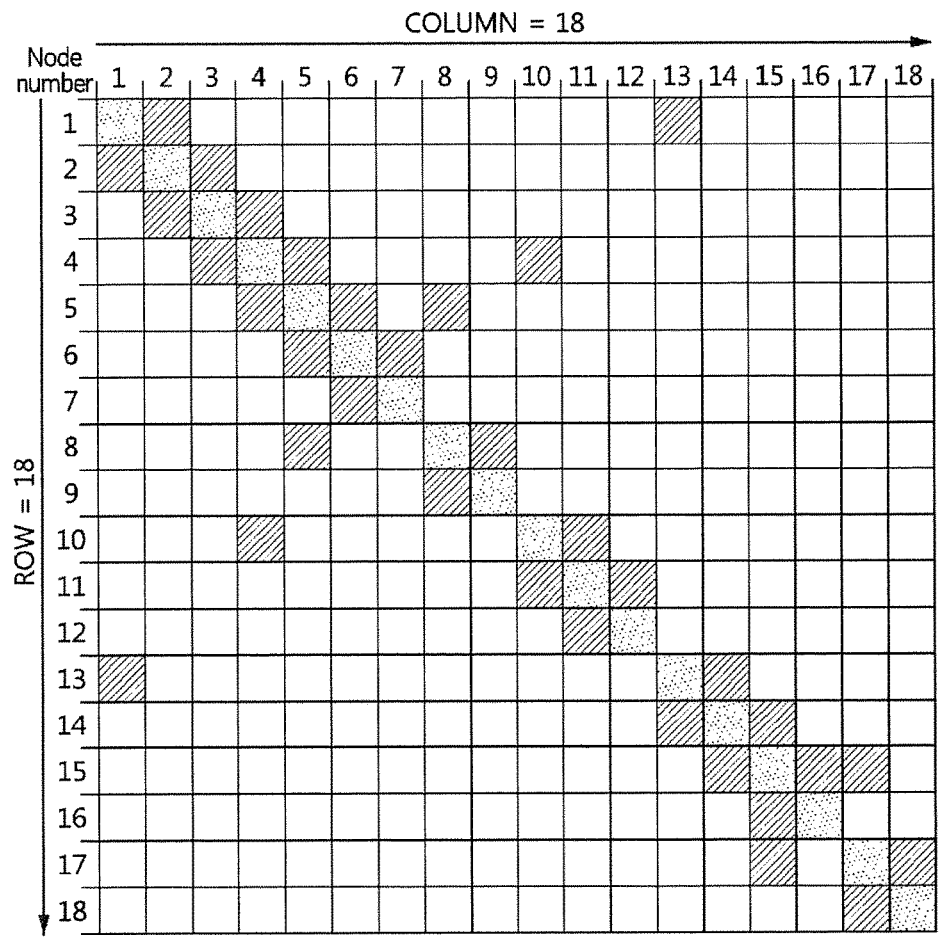
FIG. 3 is a diagram illustrating an operation matrix based on the analytic node state of FIG. 2.

FIG. 1 is a diagram illustrating an electrical node state for the analysis of distribution system data, FIG. 2 is a diagram illustrating an analytic node state for the analysis of distribution system data, and FIG. 3 is a diagram illustrating an operation matrix based on the analytic node state of FIG. 2.

In general, in order to execute a load flow calculation program, a fault-related calculation program or the like, that is, a program for the analysis of distribution system data, an admittance matrix and its inverse matrix, that is, the characteristic matrices of system data, should be constructed.

When a topology characteristic matrix for system analysis is constructed by converting an electrical node 1 illustrated in FIG. 1 into an analytic node 3 illustrated in FIG. 2, the size of its matrix increases if the branch point 2 of an electrical node is considered to fall within a computational range, and thus efficient computation cannot be performed upon computing an inverse matrix. That is, since the matrix illustrated in FIG. 3 has a matrix structure corresponding to the number of analytic nodes illustrated in FIG. 2, the amount of memory required to construct the matrix increases about five times when the inverse matrix of the actual matrix is computed, and thus a problem with the mathematical computation of the matrix structure based on the analytic nodes occurs. Accordingly, the present invention presents a system data abbreviation system and method that are capable of overcoming this problem.

Figure 4:
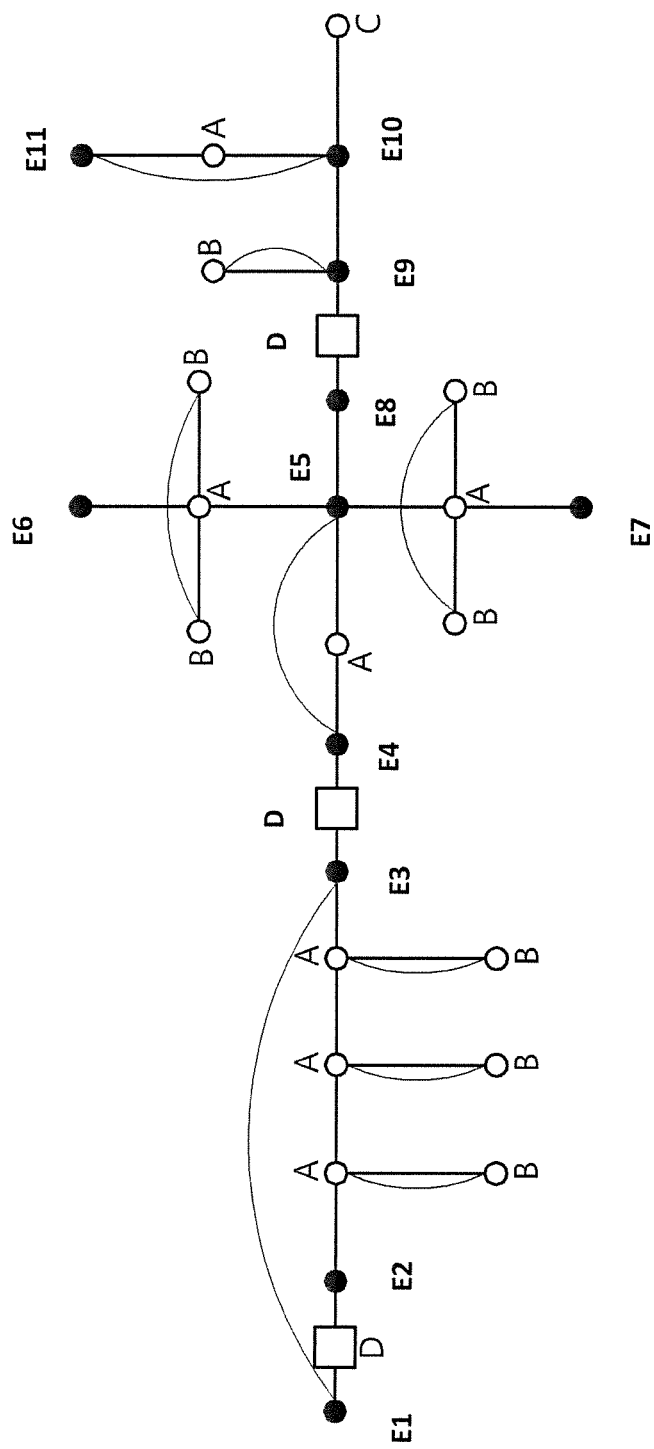
FIG. 4 is a diagram illustrating examples of electrical nodes that do not influence mathematical computation in the structure of a distribution system.
Figure 5:
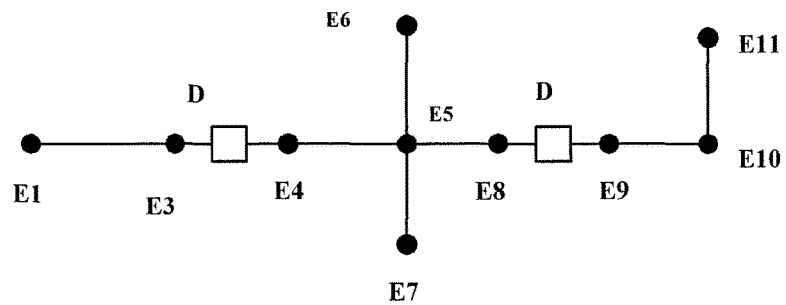
FIG. 5 is a diagram illustrating an example of the structure of a distribution system that is achieved by improving the structure of the distribution system of FIG. 4 using a system data abbreviation system and method proposed by the present invention.

FIG. 4 is a diagram illustrating examples of electrical nodes that do not influence mathematical computation in the structure of a distribution system, and FIG. 5 is a diagram illustrating an example of the structure of a distribution system that is achieved by improving the structure of the distribution system of FIG. 4 using a system data abbreviation system and method proposed by the present invention.

As illustrated in FIGS. 4 and 5, the structure of the distribution system includes a plurality of branch lines. Among electrical nodes, there are nodes that do not influence mathematical computation. These nodes may be defined as simple line section nodes A, simple line branch nodes B, a short-line-length line node C, a node D for a device at which a measurement is not made, necessary nodes E1-E11, and other nodes that should be considered for abbreviation according to the definition of an administrator. Accordingly, the present invention performs abbreviation by taking into account nodes related to devices at which a measurement is not made, that is, switches, simple branch nodes, etc., as illustrated in FIG. 5, thereby achieving the results of improving the management efficiency and practicability of an application program. As illustrated in FIG. 5, unnecessary nodes A, B, C and E2 (from the nodes E1-E10) in FIG. 4 are eliminated in terms of mathematical computation (as discussed further below with reference to FIGS. 9, 13 and 14) after abbreviation.

A system data abbreviation system and method according to embodiments of the present invention are described in detail below with reference to the accompanying drawings.

Figure 6:
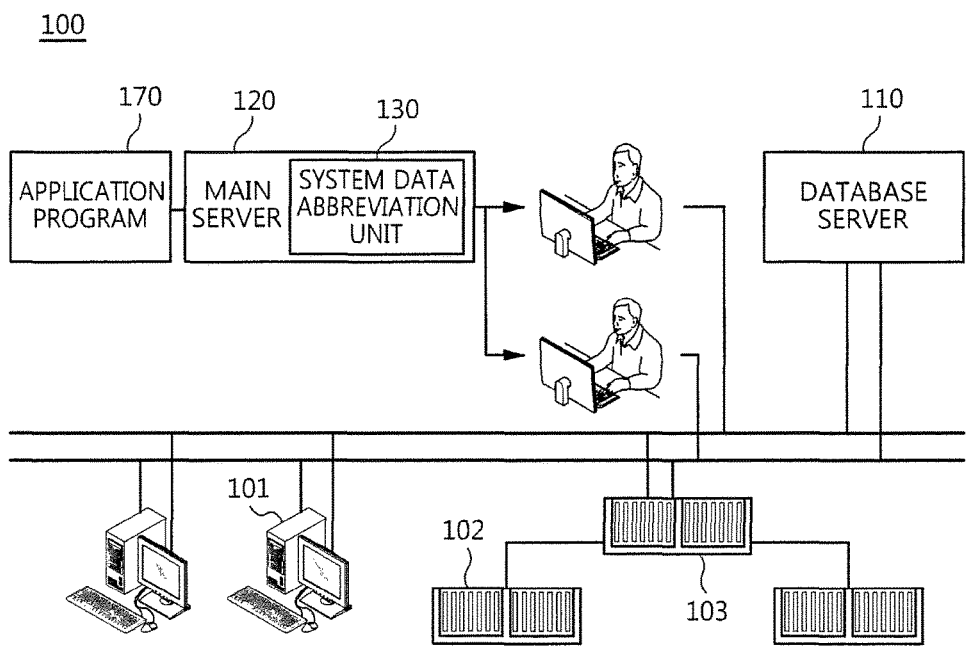
FIG. 6 is a diagram illustrating a smart distribution management system according to an embodiment of the present invention.

FIG. 6 is a diagram illustrating a smart distribution management system according to an embodiment of the present invention.

As illustrated in FIG. 6, in the smart distribution management system, a database server 110 collects distribution system data from a measurement device 102, a communication device 103, and an acquisition server 101 provided in distribution facilities, and a main server 120 includes a system data abbreviation unit 130 according to the present invention, abbreviate the collected distribution system data based on measurement information, topology information, system state information, and system state information, and provides the abbreviated data for the execution of an application program 170.

Figure 7:
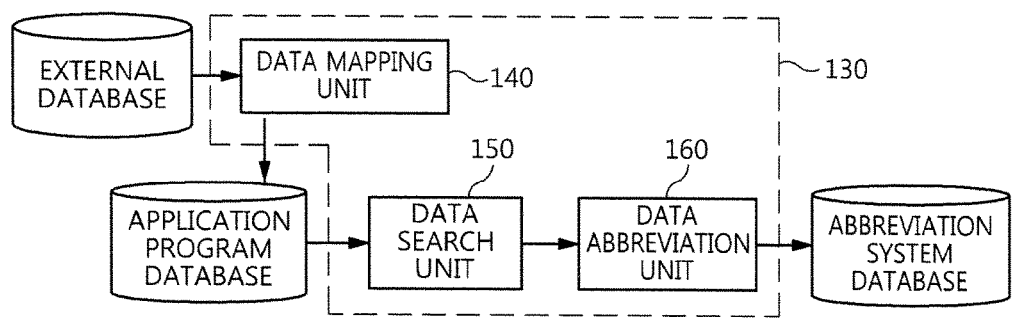
FIG. 7 is a diagram illustrating the configuration of a system data abbreviation system according to an embodiment of the present invention.
Figure 8:
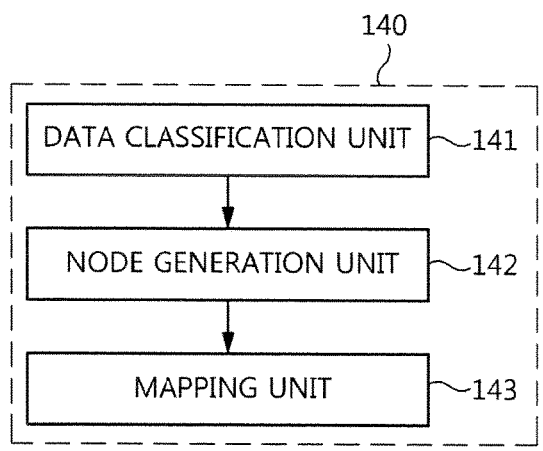
FIG. 8 is a diagram illustrating the configuration of a data mapping unit in the system data abbreviation system according to the embodiment of the present invention.
Figure 9:
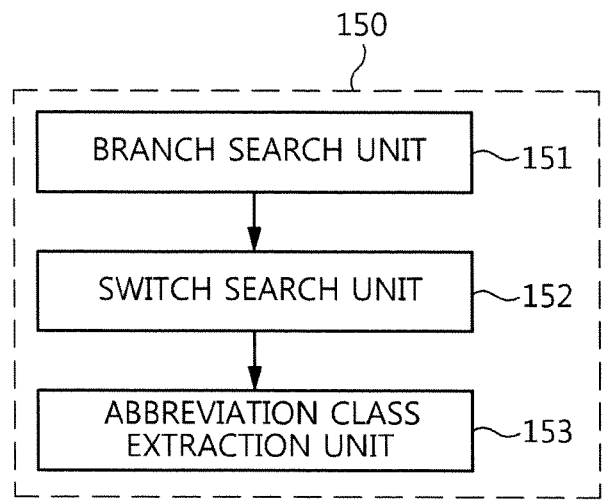
FIG. 9 is a diagram illustrating the configuration of a data search unit in the data abbreviation system according to the embodiment of the present invention.
Figure 10:
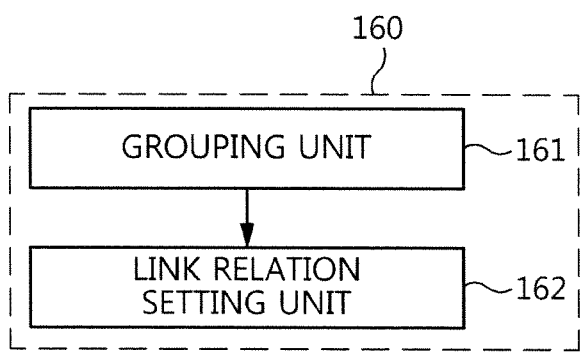
FIG. 10 is a diagram illustrating the configuration of a data abbreviation unit in the system data abbreviation system according to an embodiment of present embodiment.

FIG. 7 is a diagram illustrating the configuration of a system data abbreviation system according to an embodiment of the present invention, FIG. 8 is a diagram illustrating the configuration of a data mapping unit in the system data abbreviation system according to the present embodiment, FIG. 9 is a diagram illustrating the configuration of a data search unit in the data abbreviation system according to the present embodiment, and FIG. 10 is a diagram illustrating the configuration of a data abbreviation unit in the system data abbreviation system according to the present embodiment.

As illustrated in FIG. 7, a system data abbreviation system 130 according to the present invention includes a data mapping unit 140, a data search unit 150, and a data abbreviation unit 160.

The data mapping unit 140 classifies system data, provided by an external database, into the classes of the database of an internal application program, and then maps the classified system data. The data mapping unit 140 is intended to map the database of the external system to a database managed by a smart distribution management system in accordance with association with the external system, that is, to make the data configuration of the external system and the data configuration of the smart distribution management system coincident with each other based on databases. In this case, the database of the application program refers to a database that is constructed for an analysis application program based on measurement information, topology information, system state information, system state information, etc.

As illustrated in FIG. 8, the data mapping unit 140 includes a data classification unit 141, a node generation unit 142, and a mapping unit 143.

The data classification unit 141 classifies the system data of an external database into the data classes of an application program database. Mapping classifies the system data into classes using the classification unit 141 because devices that are the same in terms of the system may be of different models. In this case, each of the classes is chiefly classified as a branch or a switch. The data classification unit 141 counts the number of pieces of data that belongs to each class, and performs classification into a number of classes equal to the number of pieces of data.

The node generation unit 142 generates nodes based on the class of the data. The node generation unit 142 numbers the generated nodes.

The mapping unit 143 performs mapping that generates a link structure between the generated nodes and the data of the corresponding class that has generated the nodes. In this case, the generated link structure generates only a simple direct relational link structure. However, in this case, when the link structure between the generated nodes and the data of the corresponding class that has generated the nodes has not been generated, the mapping unit 143 searches for a class similar to the class to which the data belongs. In greater detail, the mapping unit 143 searches for a class to which the data that has not been mapped belongs. If there is no similar class, a one-node model is generated. In contrast, if there is a similar class, a conversional path to the corresponding similar class is designated, thereby enabling mapping to be performed.

The data search unit 150 searches for the data of the class to be abbreviated from the database of the application program. The data search unit 150 constructs a data group to be abbreviated in the database of the application program, and flags the data that is being abbreviated. In this case, although the class to be searched for is described as being limited to only the branch or switch of all classes, the class is not limited thereto. That is, all data connected to the node of the corresponding data of the class is searched.

For this purpose, as illustrated in FIG. 9, the data search unit 150 includes a branch search unit 151, a switch search unit 152, and an abbreviation class extraction unit 153.

The branch search unit 151 checks whether lines have been connected to the node of data in order to determine whether the node of the corresponding data is an unnecessary node, that is, a simple branch. In this case, it is determined whether the connected lines of the corresponding node are three or more in number. The found branch node is entered in a list, and the node entered in the list is flagged.

The switch search unit 152 checks whether a switch provided at the node of data is a manual switch or a user-designated switch. That is, the switch search unit 152 checks whether a switch is a manual switch having no measurement value or a switch for which a user can designate a measurement value, which is a device at which a measurement is not made. This is intended to eliminate a node unnecessary in terms of mathematical computation. In this case, the switch search unit 152 enters the found switch node in a list, and flags the node entered in the list, like the branch search unit 151.

The abbreviation class extraction unit 153 extracts the data of the corresponding class as an abbreviation class if the lines of the node are three or more in number or the switch provided at the node is not a manual switch or a user-designed switch.

The data abbreviation unit 160 groups the data of the found abbreviation class, sets link relations between the data that belongs to each group, sets link relations between the group and the classes of the database of the application program, and then abbreviates the data.

For this purpose, as illustrated in FIG. 10, the data abbreviation unit 160 includes a grouping unit 161, and a link relation setting unit 162.

The grouping unit 161 groups the data of a class to be abbreviated.

The link relation setting unit 162 sets link relations between the data that belongs to each group, and sets link relations between the corresponding group and the classes of the database of the application program.

The link relations set by the data abbreviation unit 160 are stored in a system abbreviation database.

Figure 11:
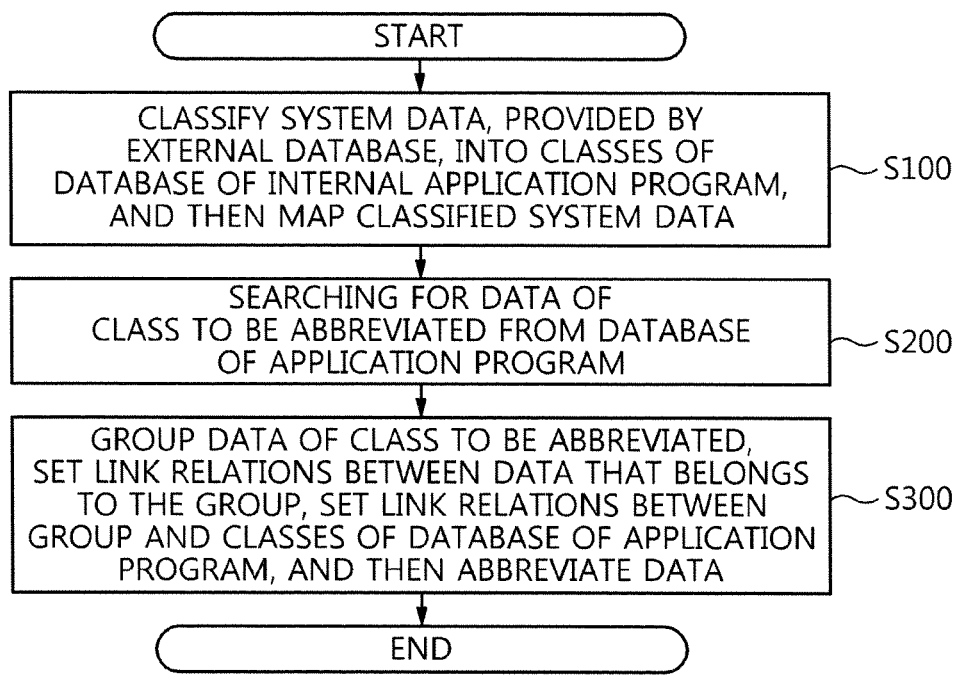
FIG. 11 is a diagram illustrating the sequence of a system data abbreviation method according to the embodiment of the present invention.
Figure 12:
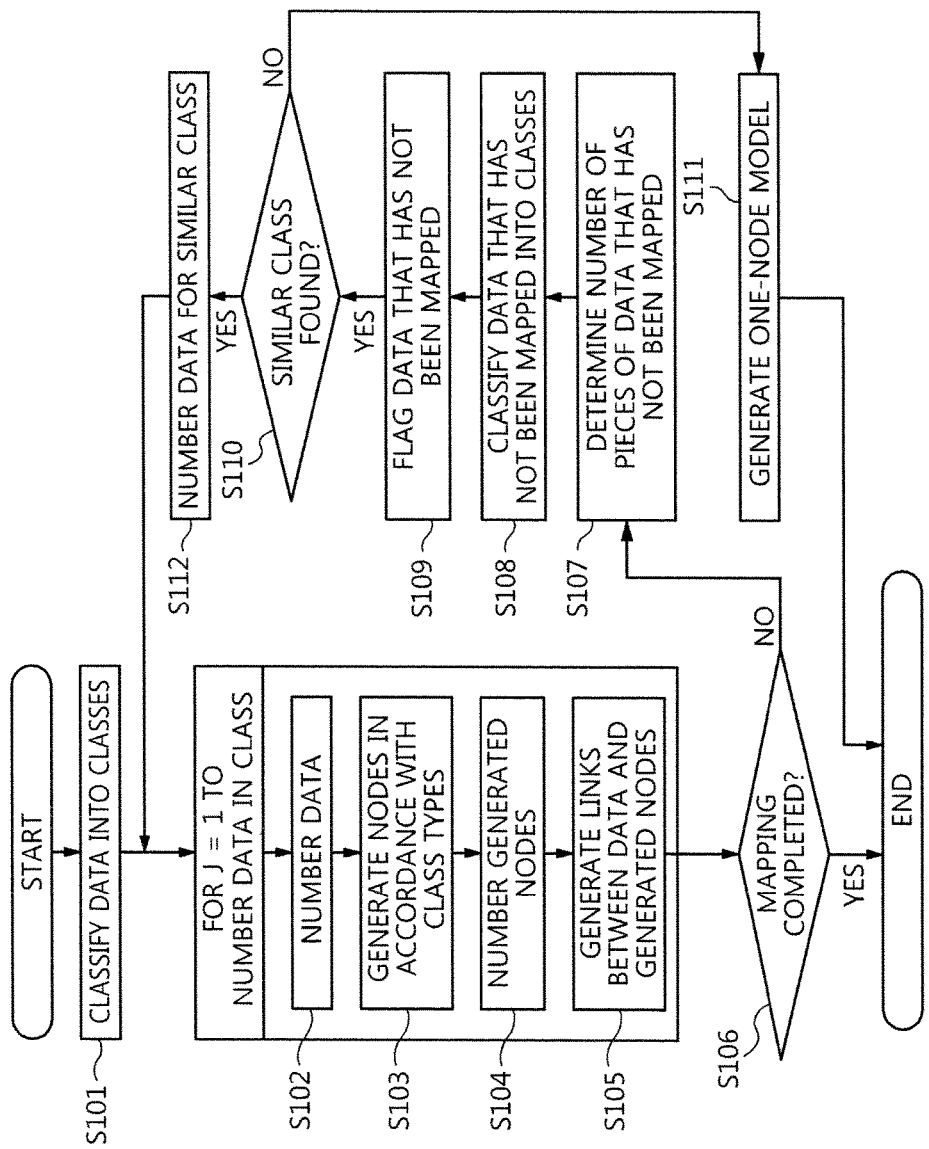
FIG. 12 is a diagram illustrating a method of mapping data in the sequence of the system data abbreviation method according to the embodiment of the present invention.
Figure 13:
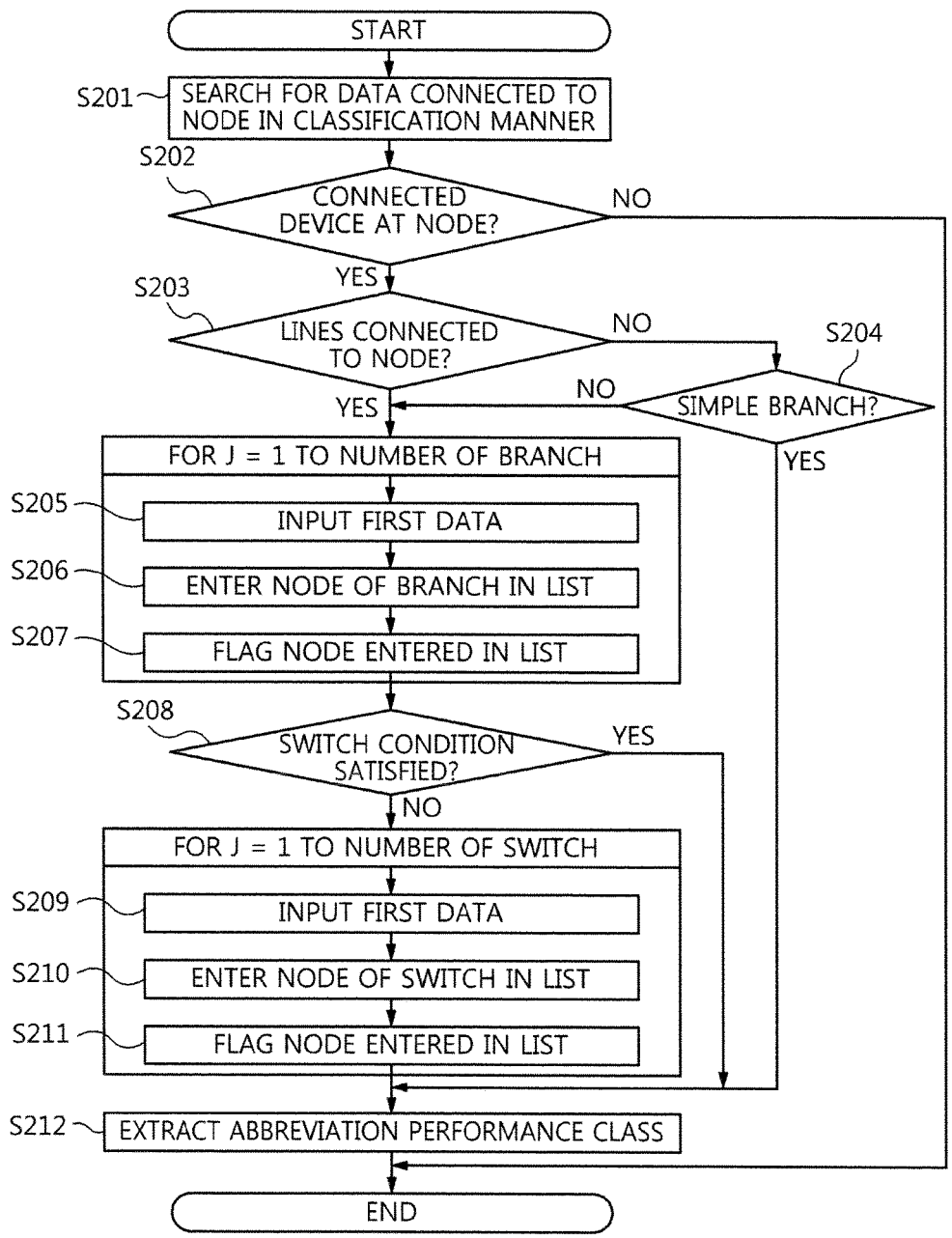
Figure 14:
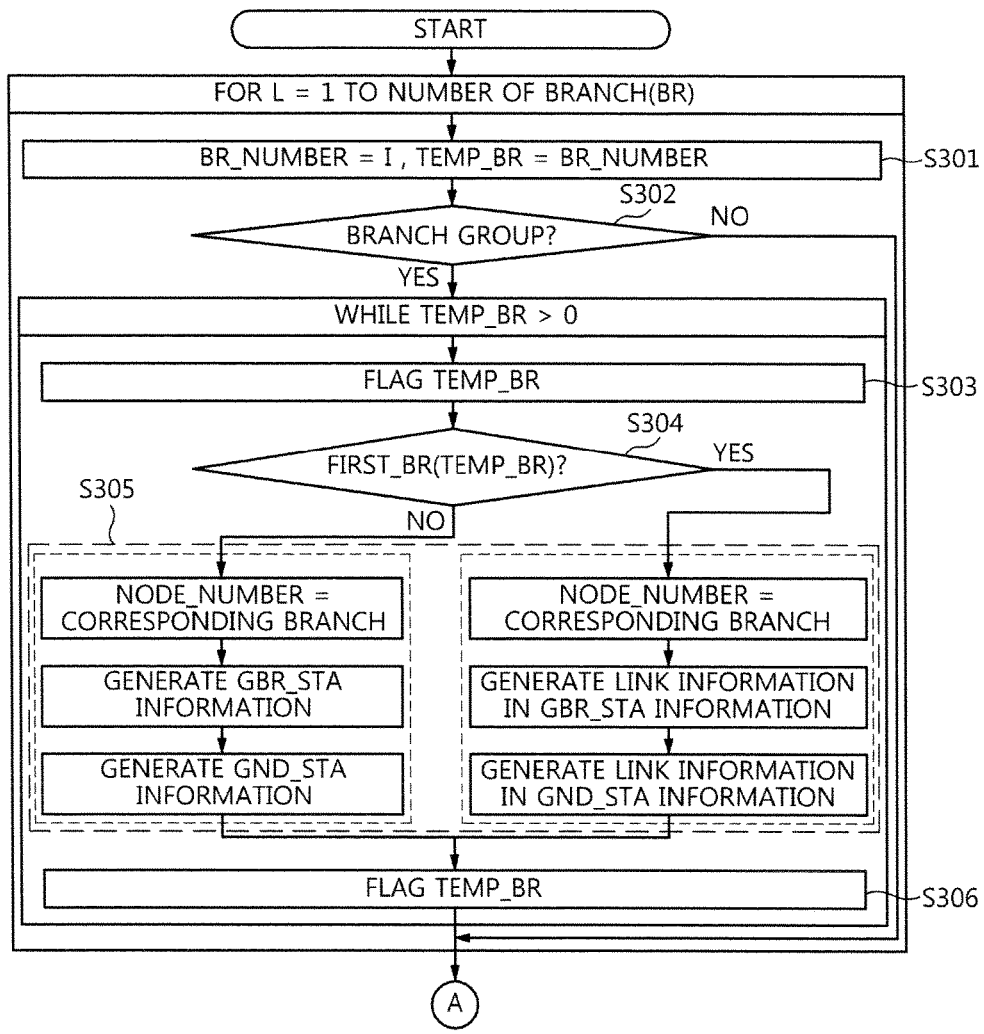
FIGS. 14 and 15 are diagrams illustrating a method of searching data in the sequence of the system data abbreviation method according to the embodiment of the present invention.

FIG. 11 is a diagram illustrating the sequence of a system data abbreviation method according to an embodiment of the present invention, FIG. 12 is a diagram illustrating a method of mapping data in the sequence of the system data abbreviation method according to the present embodiment, FIG. 13 is a diagram illustrating a method of searching data in the sequence of the system data abbreviation method according to the present embodiment, and FIG. 14 is a diagram illustrating a method of converting data in the sequence of the system data abbreviation method according to the present embodiment.

As illustrated in FIG. 11, in the system data abbreviation method according to the present embodiment, first, system data, provided by the external database, is classified into the classes of the database of the internal application program and then the classified system data is mapped at step S100.

As illustrated in FIG. 12, the number of pieces of data that belongs to each class is counted at step S102, and classification into a number of classes equal to the number of pieces of data is performed. Thereafter, nodes based on the class of the data are generated at step S103, and the generated nodes are numbered at step S104. Thereafter, mapping that generates a link structure between the generated nodes and the data of the corresponding class that has generated the nodes at step S105 is performed at step S106. However, in this case, if the link structure between the generated nodes and the data of the corresponding class that has generated the nodes has not been generated, the number of pieces of data that has not been mapped is determined at step S107, a class to which the corresponding data belongs is identified at step S108, and the data is flagged at step S109. Thereafter, a class similar to the class to which the data belongs is searches for at step S110. If there is no similar class, a one-node model is generated at step S111. If there is a similar class, a conversional path to the corresponding similar class is designated and data for the similar class is numbered at step S112, thereby enabling mapping to be performed.

Thereafter, the data of the class to be abbreviated is searched for from the database of the application program at step S200.

As illustrated in FIGS. 13 and 14, data connected to each node is searched for in a classification manner at step S201. Thereafter, it is determined whether a connected device is present at the node at step S202. Thereafter, in order to determine whether the node of the corresponding data to be abbreviated is a node unnecessary in terms of mathematical computation, that is, a simple branch at step S204, it is determined whether lines have been connected to the node of data at step S203. In this case, it is whether the connected lines of the corresponding node are three or more in number. If the connected lines of the corresponding node are three or more in number, the data of the found branch node is received at step S205 and entered in a list of the corresponding branch node at step S206, and the node entered in the list is flagged at step S207. In order to eliminate the node of a device, at which a measurement is not made, unnecessary in terms of mathematical computation, it is determined whether a switch provided at the node of the data is a manual switch or a user-designated switch at step S208, and the data of the found switch node is received at step S209. If the switch is a manual switch or a user-designated switch, the found switch node is entered in a list at step S210, and the node entered in the list is flagged at step S211. Thereafter, if the connected lines of the node are three or more in number or the switch provided at the node is not a manual switch or a user-designed switch, the data of the corresponding class is extracted as an abbreviation class.

Thereafter, the data of the found abbreviation class is grouped, link relations between the data that belongs to each group are set, link relations between the group and the classes of the database of the application program are set, and then the data is abbreviated at step S300.

Figure 15:
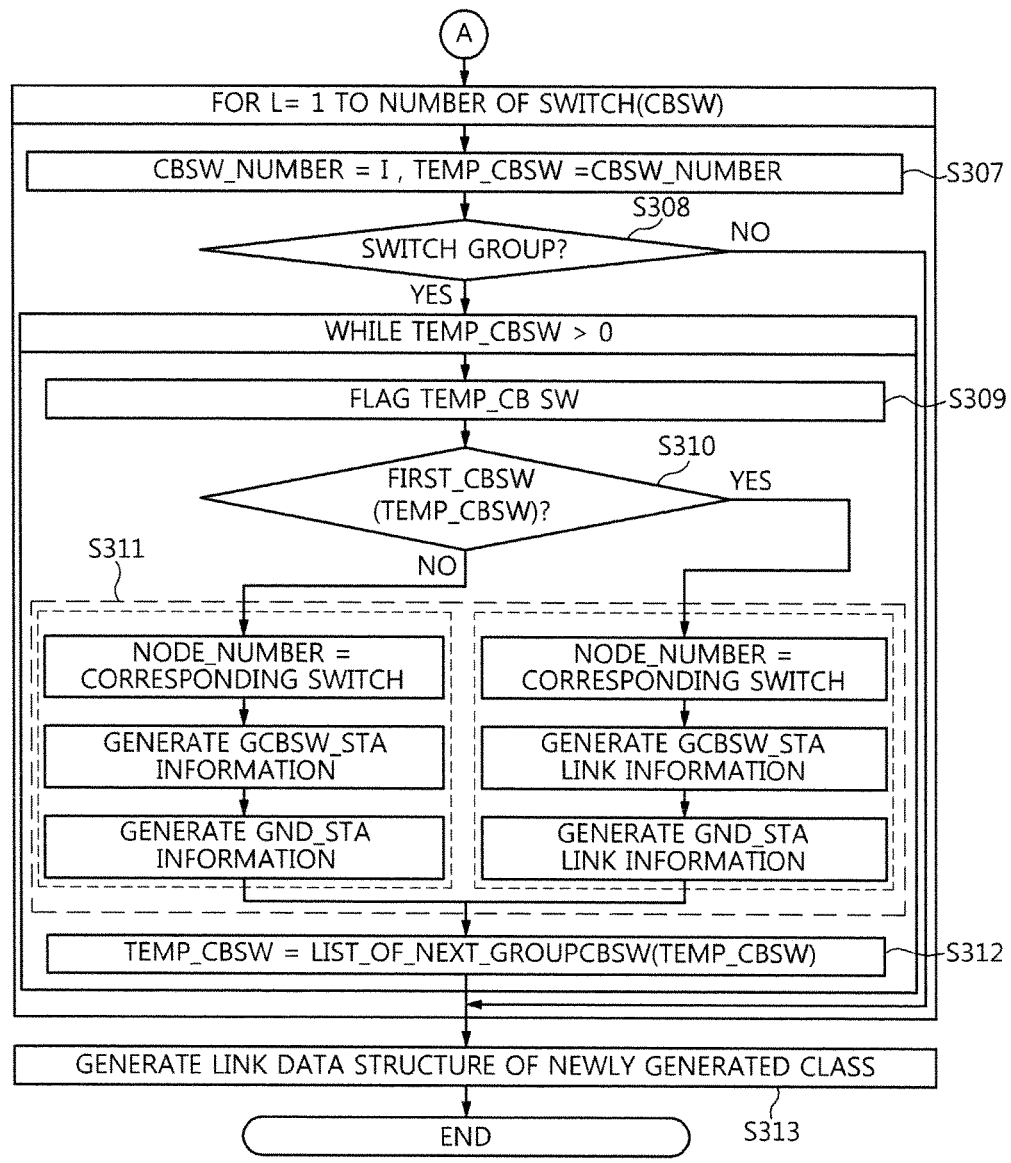

As illustrated in FIG. 15, the data of the grouped abbreviated class, that is, line data, determines whether the group is a branch or a switch, the presence of the corresponding group flag is determined, and the line data is flagged at steps S301 to S312. Thereafter, link relations between data that belongs to the group are set and link relations between the corresponding group and the classes of the database of the application program are set at step S313.

As described above, the system data abbreviation system and method according to the present classify the distribution system topology data of a smart distribution management system into classes, group the data and thus abbreviate the data, thereby improving the management efficiency and practicability of an application program.

Furthermore, the present invention classify distribution system topology data into classes, group the data and thus abbreviate the data, thereby providing accurate system state information to the administrator of a smart distribution management system.

Furthermore, the present invention classify distribution system topology data into classes, group the data and thus abbreviate the data, thereby eliminating electrical nodes unnecessary in terms of mathematical computation, and thus increasing the efficiency of mathematical computation attributable to analytic nodes.

As described above, the optimum embodiments have been disclosed in the drawings and the specification. Although specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true ranges of protection of the present invention should be defined based on the technical spirit of the attached claims.

The invention claimed is:

1. A system data abbreviation system, comprising a system data abbreviation processor configured to:
classify system data into classes of a database of an internal application program and mapping the classified system data;
search for data of the class to be abbreviated from the database of the application program; and
group the searched data of the class, set link relations between data that belongs to the group, set link relations between the group and the classes of the database of the application program, and abbreviate the data,
wherein the system data abbreviation processor further:
classifies the system data into the data classes of the application program database;
generates nodes based on the classes of the data; and
performs mapping that generates a link structure between the nodes and the data,
wherein the link structure is set as a link relation between a group having the data of an abbreviation class of the classes extracted according to a pre-defined condition and data of the application program database to eliminate unnecessary nodes, and
wherein the pre-defined condition is when lines of a node are three or more in number or a switch provided at the node is not a manual switch or a user-designed switch,
wherein the system data abbreviation processor checks whether lines have been connected to the node of the data in order to determine whether the corresponding data is a simple branch;
checks whether a switch provided at the node of the data is a manual switch or a user-designated switch; and
extracts the data of the corresponding class as an abbreviation class, when the connected lines of the node are three or more in number or the switch provided at the node of the data is not a manual switch or a user-designated switch the node,
wherein the data classes of the database of the application program are each classified as a branch or a switch.

2. The system data abbreviation system of claim 1, wherein the system data abbreviation processor, when the link structure between the nodes and the data has not been generated, searches for a class similar to the class that the data belongs, and then performs the mapping.

3. The system data abbreviation system of claim 1, wherein the system data abbreviation processor groups the class of the data to be abbreviated; and sets link relations between the data that belongs to the group, and sets link relations between the group and the classes of the database of the application program.

4. The system data abbreviation system of claim 1, further comprising a system abbreviation database for storing the link relations set by the system data abbreviation processor.

5. A system data abbreviation method, comprising:
classifying system data into classes of a database of an internal application program, and then mapping the classified system data;
searching for data of the class to be abbreviated from the database of the application program; and
grouping the searched data of the class, setting link relations between data that belongs to the group, setting link relations between the group and the classes of the database of the application program, and then abbreviating the data, wherein the classifying comprises:
classifying the system data into the data classes of the application program database;
generating nodes based on the classes of the data; and
performing mapping that generates a link structure between the nodes and the data,
wherein the link structure is set as a link relation between a group having the data of an abbreviation class of the classes extracted according to a pre-defined condition and data of the application program database to eliminate unnecessary nodes, and
wherein the pre-defined condition is when lines of a node are three or more in number or a switch provided at the node is not a manual switch or a use designed switch,
wherein searching for the data of the class to be abbreviated comprises:
checking whether lines have been connected to the node of the data in order to determine whether the corresponding data is a simple branch;
checking whether a switch provided at the node of the data is a manual switch or a user-designated switch; and
when the connected lines of the node are three or more in number or the switch provided at the node of the data is not a manual switch or a user-designated switch the node, extracting the data of the corresponding class as an abbreviation class,
wherein the data classes of the database of the application program are each classified as a branch or a switch.

6. The system data abbreviation method of claim 5, wherein performing the mapping, when the link structure between the nodes and the data has not been generated, comprises searching for a class similar to the class that the data belongs, and then performing the mapping.

7. The system data abbreviation method of claim 5, wherein abbreviating the data comprises:
grouping the data of the class to be abbreviated; and
setting link relations between the data that belongs to the group, and also setting link relations between the group and the classes of the database of the application program.

* * * * *